US 6,651,411 B1

United States Patent
Becker et al.

(10) Patent No.: US 6,651,411 B1
(45) Date of Patent: Nov. 25, 2003

(54) FORE/AFT POSITION SENSOR FOR A HARVESTING REEL

(75) Inventors: Klaus Ernst Becker, Horizontina (BR); Timothy Franklin Christensen, Moline, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/216,016

(22) Filed: Aug. 9, 2002

(51) Int. Cl.[7] .................... A01D 75/28; A01D 57/04
(52) U.S. Cl. .................... 56/10.2 R; 56/10.2 A; 56/221
(58) Field of Search ............... 56/10.2 R, 10.2 A, 56/16.1, 220, 219, 221

(56) References Cited

U.S. PATENT DOCUMENTS

| | | | | |
|---|---|---|---|---|
| 3,599,410 A | * | 8/1971 | de Coene et al. | 56/221 |
| 3,722,193 A | * | 3/1973 | Strubbe | 56/208 |
| 4,124,970 A | * | 11/1978 | Bernhardt | 56/10.2 E |
| 4,776,153 A | * | 10/1988 | DePauw et al. | 56/10.2 E |
| 5,261,216 A | * | 11/1993 | Schumacher et al. | 56/14.4 |
| 5,524,424 A | * | 6/1996 | Halgrimson et al. | 56/10.2 D |
| 6,138,447 A | | 10/2000 | Stivers et al. | 56/221 |
| 6,195,972 B1 | * | 3/2001 | Talbot et al. | 56/364 |

FOREIGN PATENT DOCUMENTS

DE        19711045     * 9/1998 ........... A01D/57/02

OTHER PUBLICATIONS

*900 Series Flex Platforms*, From www.dakotalandeq.com web site, late updated Sep. 21, 2001.
*Gathering Soybeans is Challenging*, From www.uaex.edu web site, © 1999, 2000 University of Arkansas.

* cited by examiner

*Primary Examiner*—Robert E. Pezzuto
*Assistant Examiner*—Alicia Torres

(57) ABSTRACT

A harvesting reel is rotatably mounted on left and right saddles. The saddles are slidably positioned on fore/aft extending arms. A fore/aft position sensor is located between one of the fore/aft extending arms and the respective saddle. The fore/aft extending arm is provided with a slot that extends along the arm at an angle thereto. A sensing finger engages the slot and is coupled to a potentiometer by a sensing arm. As the fore/aft position of the reel changes, the relative position of the sensing finger changes creating a changing electrical output from the potentiometer. The resulting potentiometer voltage represents a fore/aft position signal that is directed to a controller.

17 Claims, 4 Drawing Sheets

FORE/AFT POSITION SENSOR FOR A HARVESTING REEL

FIELD OF THE INVENTION

The present invention is directed to a control system for moving a reel on a harvesting platform fore and aft.

BACKGROUND OF THE INVENTION

Agricultural combines are provided with harvesting platforms. These harvesting platforms typically comprise a transversely extending frame having a transversely extending auger and reel. The frame is provided with a front edge having a cutter bar for cutting a standing crop. The central rear portion of the frame is provided with a central opening through which harvested crop is directed to the feeder house of the combine.

The fore/aft position of the reel relative to the frame is controlled by an operator located in the operator's station of the combine. As the combine moves through a field, crop conditions change, requiring the operator to change the fore/aft position of the reel relative to the frame to maintain optimal harvesting performance. For example, if the operator encounters downed crop (standing crop that has blown over) he would want to move the reel forwardly and downwardly to better engage the downed crop. Similarly for crop standing upright the operator would want the reel moved rearwardly from the forward most position.

Combines have been provided with fore/aft control systems for harvesting reels. In these systems the harvesting platform is provided with a fore/aft reel position sensor that generates a fore/aft position signal that is directed to a controller. The controller in turn controls the extension and retraction of hydraulic cylinders that move the reel fore and aft by signaling an electrohydraulic circuit control hydraulic valves. The controller is typically provided with additional inputs for manually controlling the fore/aft position of the reel and for placing the reel in a preselected fore/aft position relative to the frame.

The fore/aft position sensors used on these systems have used a potentiometer to generate the fore/aft position signal. The signaling potentiometer is coupled to the reel and/or saddles by linkages that may need adjustment.

SUMMARY OF THE INVENTION

It is an object of the present invention to provide a simple and robust fore/aft position sensor for a harvesting reel.

The harvesting reel is rotatably mounted on saddles that are slidably positioned on fore/aft extending arms. The fore/aft position of the saddles is controlled by hydraulic cylinders. The fore/aft position sensor is located between one of the fore/aft extending arms and the respective saddle. The fore/aft extending arm is provided with a slot that extends along the arm at a vertical angle. A sensing finger engages the slot and is coupled to a signal generator by a sensing arm. The signal generator comprising a potentiometer. As the fore/aft position of the reel changes, the vertical position of the sensing finger changes creating an electrical output from the potentiometer. The resulting potentiometer voltage represents a fore/aft position signal that is directed to a controller.

DETAILED DESCRIPTION

Figure 1:
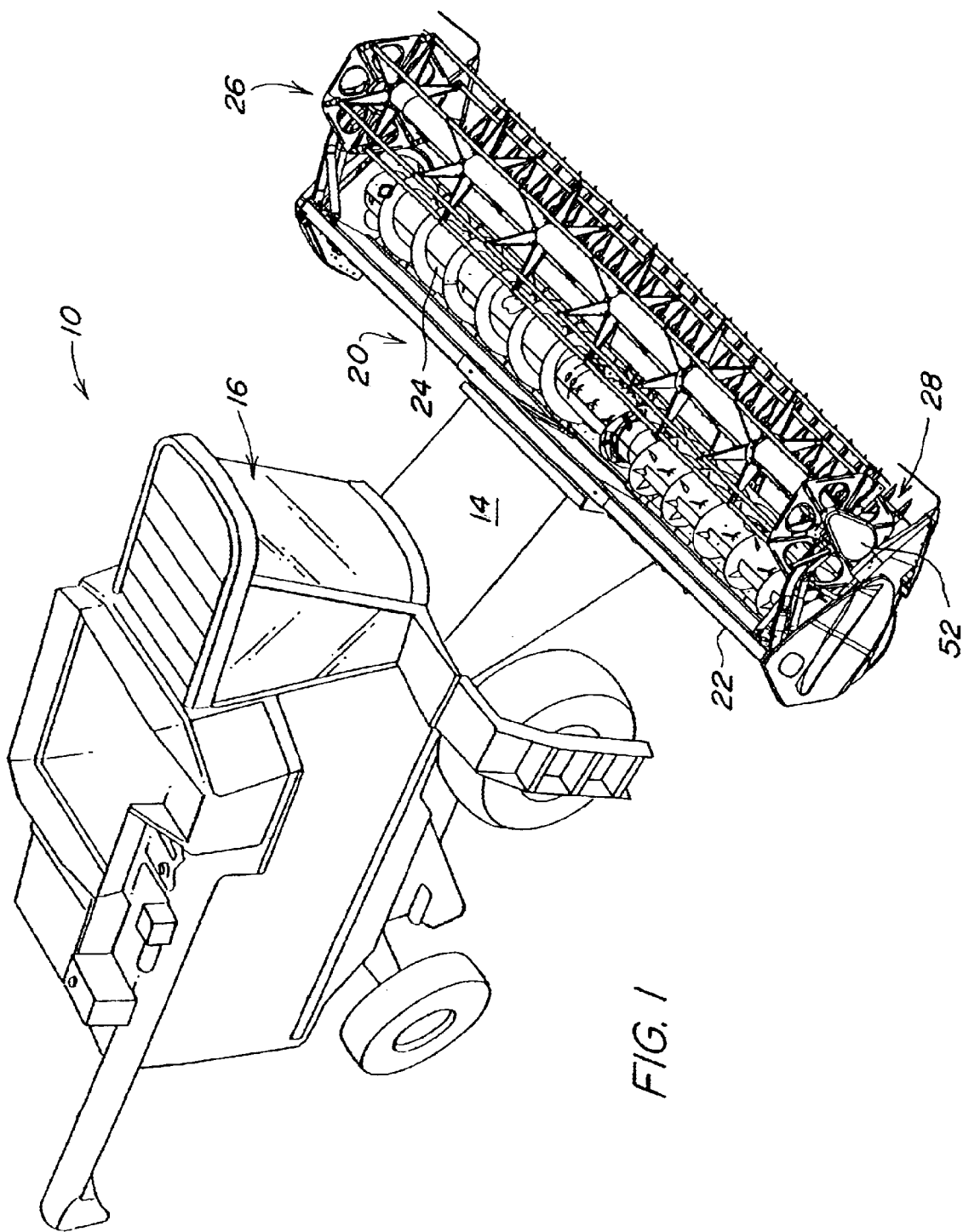
FIG. 1 is a perspective view of an agricultural combine having a harvesting platform.

Agricultural combine 10 is provided with a feeder house 14 to which is mounted a harvesting platform 20. The operation of the combine and the harvesting platform is controlled by an operator from an operator's station 16.

The harvesting platform 20 comprises a transversely extending frame 22, a transversely extending auger 24 and a transversely extending reel 26. The frame has a front edge 28 for engaging a standing crop. The front edge 28 is provided with a cutter bar for cutting the standing crop. The rotating reel 26 engages the standing crop and holds it against the cutter bar. After the standing crop is cut the reel 26 directs the cut crop material to the auger 24. The helical flights on the auger 24 pull the cut crop to the center of the platform 20. Crop engagement fingers 30 on the central portion of the auger 24 direct the cut crop rearwardly through a rear opening 32 that is in communication with the feeder house 12. In this way the harvesting platform directs a harvested crop to the combine 10.

A first arm 34 and a second arm 36 extend forwardly from the frame 22. Both arms 34 and 36 are pivotally coupled to the frame 22 by pivots 35. The arms 34 and 36 can be pivoted relative to the frame by vertical positioning hydraulic cylinders 38.

Figure 2:
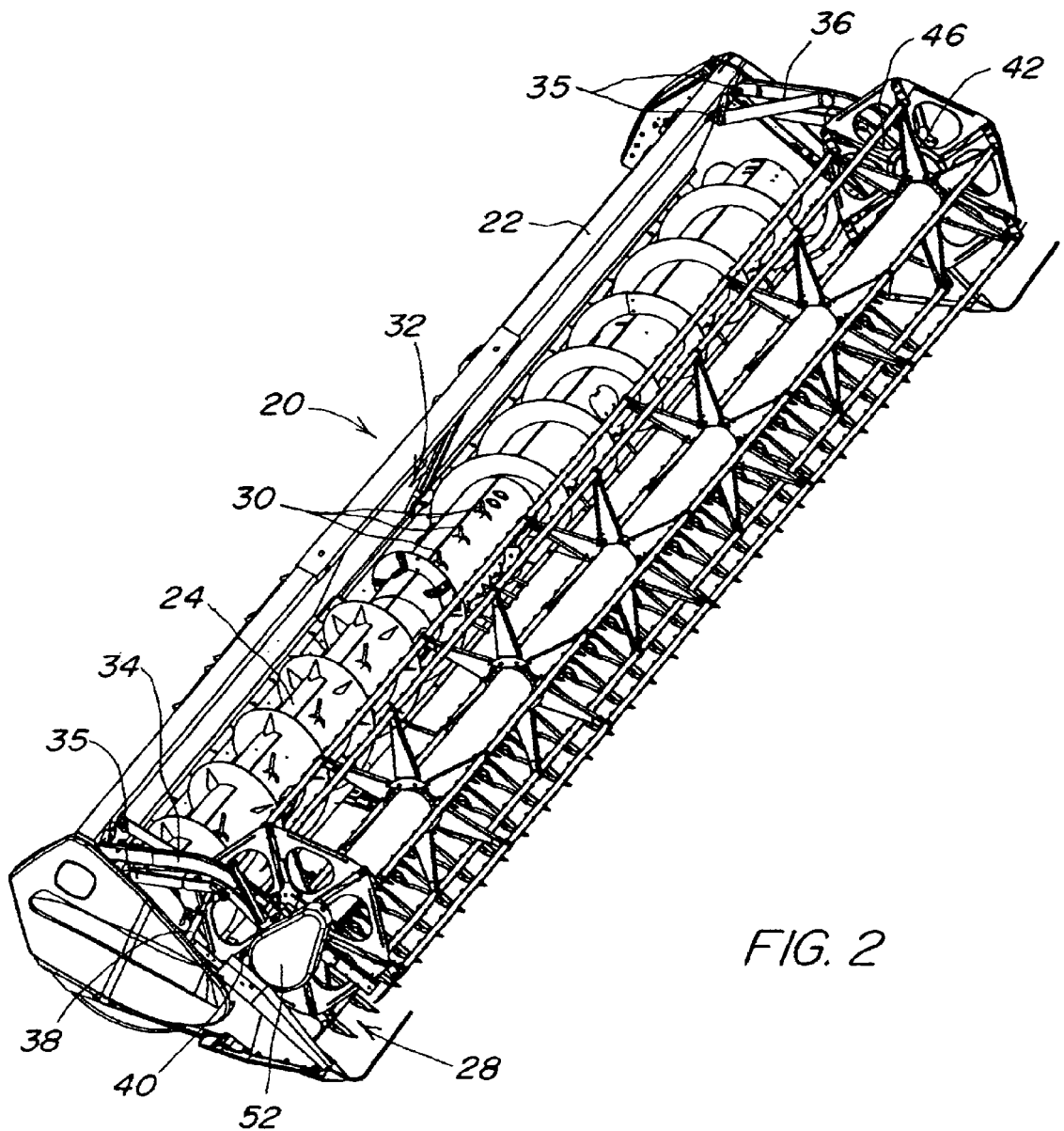
FIG. 2 is an enlarged perspective view of the harvesting platform.
Figure 3:
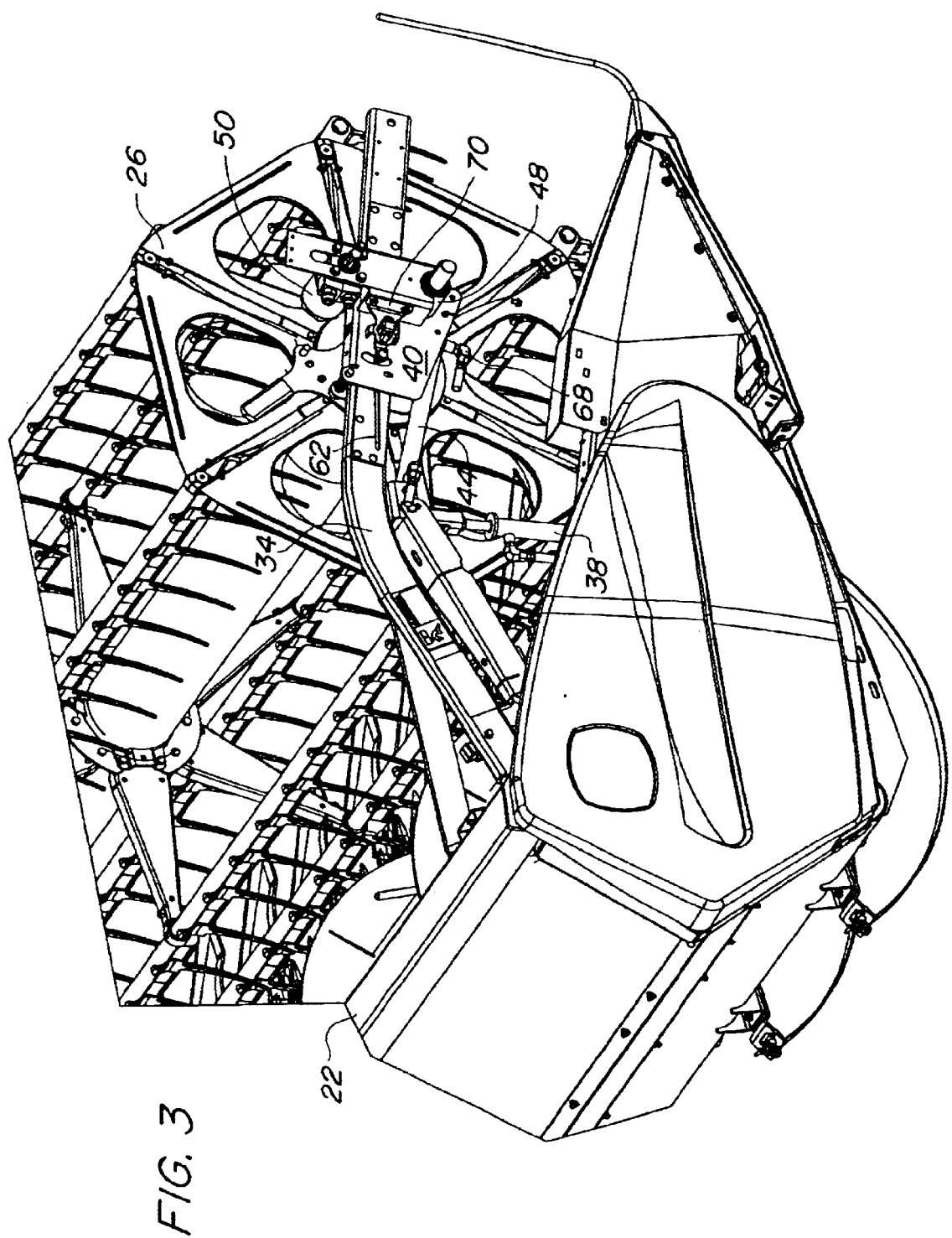
FIG. 3 is an enlarged perspective view of the right end of the harvesting platform.
Figure 4:
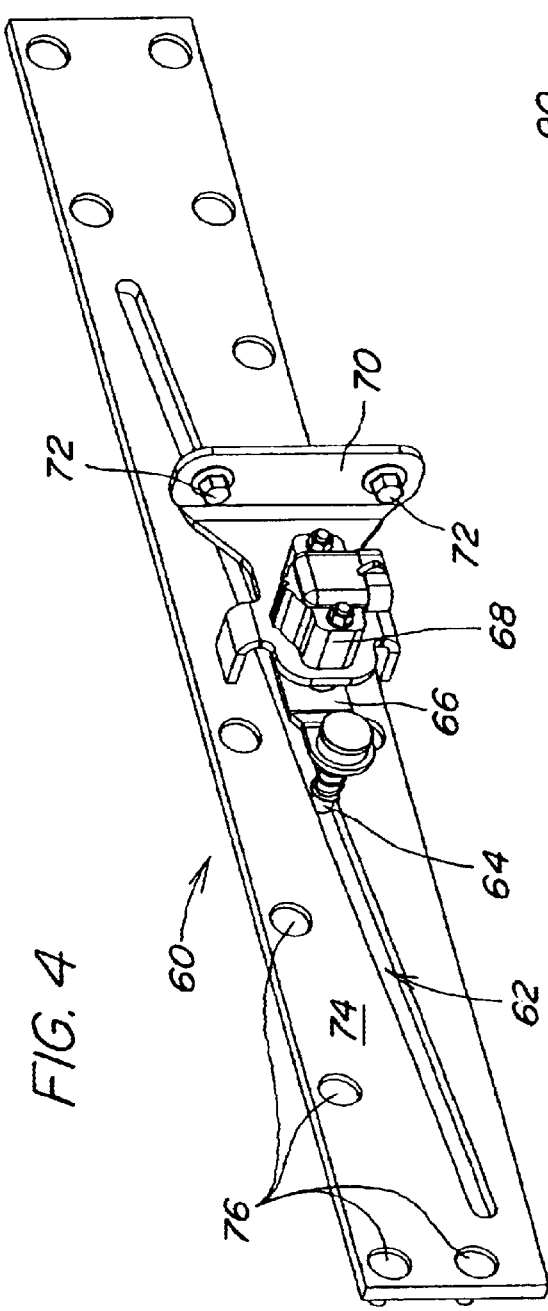
FIG. 4 is an enlarged perspective view of the fore/aft position sensor.

A first saddle 40 is slidably positioned on the first arm 34 and a second saddle 42 is slidably positioned on the second arm 36. The first saddle 40 can be longitudinally positioned along the first arm 34 by a first linear actuator 44, and the second saddle 42 can be longitudinally positioned along the second arm 36 by a second linear actuator 46. In the illustrated embodiment both linear actuators 44 and 46 are double acting hydraulic cylinders. The transversely extending reel 26 is rotatably mounted to the saddles 40 and 42 by bearings 48, only the right one shown in FIG. 3. The reel 26 is rotated by a hydraulic motor 50 mounted to the first saddle 40 through a gear train, not shown. The bearing 48 and motor 50 are best illustrated in FIG. 3 as they are covered by a shield 52 illustrated in FIGS. 1 and 2.

The first saddle 40 is provided with a fore/aft position sensor 60. The fore/aft position sensor 60 comprises a slot 62, a sensing pin 64 received in the slot 62, a sensing arm 66 connected to the sensing pin and a potentiometer 68 connected to the sensing arm 66. The potentiometer 68 is mounted on a bracket 70 that is secured to the first saddle 40 by mounting bolts 72. The slot 62 is formed in a track 74 that is mounted to the first arm 34 by mounting bolts or rivets 76. The slot 62 is angled relative to the longitudinal direction of the first arm 34 in the illustrated embodiment the slot is angled vertically relative to the longitudinal direction of the first arm. Therefore as the reel 26 moves from back-to-front along the first arm 34 the sensing pin 64 moves both back-to-front and also upwardly relative to the reel 26. This upward movement of the sensing pin 64 is transmitted to the potentiometer 68 by sensing arm 66. In response to this upward motion the potentiometer 68 produces a voltage forming a fore/aft position signal. Therefore the potentiometer 68 produces a different voltage or fore/aft position signal for each reel location along the first arm 34. Clearly the slot 62 could also be angled downward relative to the movement of the reel 26. It is only necessary that the sensing pin be in a different vertical location for each position along the reel's path of travel.

Figure 5:
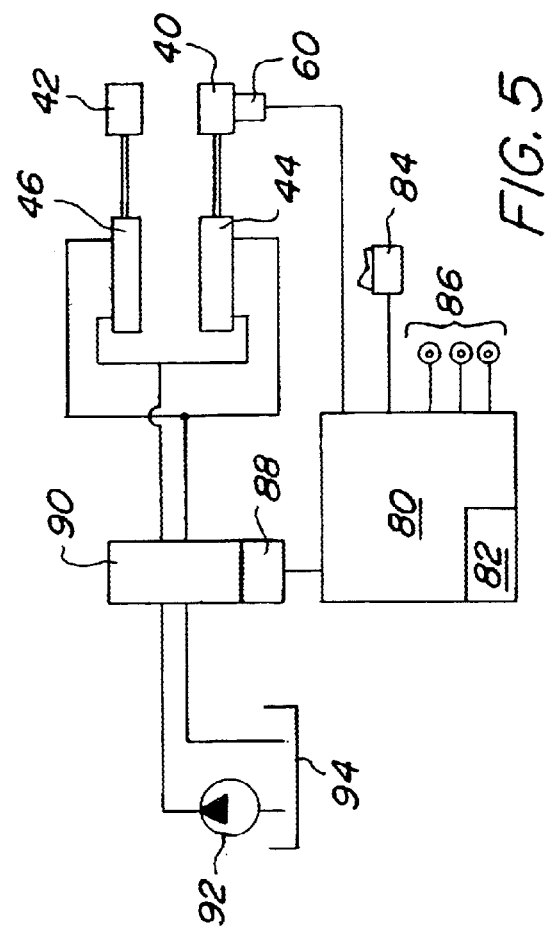
FIG. 5 is an electrical/hydraulic schematic of the reel fore/aft positioning control system.

As illustrated in FIG. 5, the fore/aft position signal from fore/aft position sensor 60 is directed to a controller 80. The controller 80 being a microprocessor having a memory 82. The controller is provided with additional inputs comprising a manual control switch 84 and predefined position switches 86. The manual control switch 84 is typically a rocker switch and allows the operator to selectively move the reel 26 in the fore/aft direction. The predefined position switches 86 move the reel to a predefined fore/aft position defined by the fore/aft position signal. The illustrated embodiment is provided with three predefined position switches 86 defining three defined positions. These predefined positions could be a full forward position, a full aft position and some intermediate position. An output positioning signal of the controller 80 is directed to an electrohydraulic circuit 88 controlling hydraulic valves 90. Hydraulic valves 90 regulate the flow of pressurized hydraulic fluid from pump 92 to the first and second fore/aft linear actuators 44 and 46 and exhausted fluid back to sump 94.

Having described the preferred embodiment, it will become apparent that various modifications can be made without departing from the scope of the invention as defined in the accompanying claims.

What is claimed is:

1. A harvesting platform for harvesting an agricultural crop, the harvesting platform comprising:
   a transversely extending frame having a front edge for engaging a crop and a rear opening for discharging the harvested crop;
   first and second arms extending forwardly from the frame in a longitudinal direction, the first arm is provided with a first saddle that is slidably positioned on the first arm, the second arm is provided with a second saddle that is slidably positioned on the second arm;
   a reel is rotatably mounted on the first and second saddles and extends transversely between the first and second saddles;
   the first saddle is provided with a first linear actuator extending between the first saddle and the frame for longitudinally sliding the first saddle along the first arm, and the second saddle is provided with a second linear actuator extending between the second saddle and the frame for longitudinally sliding the second saddle along the second arm;
   a fore/aft position sensor is provided with a slot extending longitudinally, the slot being angled relative to the longitudinal direction of the first arm, a sensing pin engages the slot for sensing the fore/aft position of the reel relative to the frame, the sensing pin is coupled to a signal generator, as the sensing pin moves longitudinally in the slot the sensing pin also moves relative to the longitudinal direction of the first arm resulting in a mechanical sensing signal that is directed to the signal generator for generating a fore/aft position signal.

2. A harvesting platform as defined by claim 1 wherein the slot is angled vertically relative to the longitudinal direction of the first arm.

3. A harvesting platform as defined by claim 2 wherein the slot is formed in a track that is mounted to the first arm.

4. A harvesting platform as defined by claim 3 wherein a sensing arm extends from the signal generator to the sensing pin.

5. A harvesting platform as defined by claim 4 wherein the fore/aft position signal is directed to a controller having a memory, the memory storing fore/aft position data of the reel relative to the frame generated by the fore/aft position sensor.

6. A harvesting platform as defined by claim 5 wherein the controller is provided with a predefined position switch, the memory is provided with predefined positions for the reel relative to the frame, the predefined positions are derived from the fore/aft position data, when the predefined position switch is actuated the controller operates the first and second linear actuators to move the reel to a predefined position stored in memory as defined by the fore/aft position signal from the fore/aft position sensor.

7. A harvesting platform as defined by claim 6 wherein the first and second linear actuators are double acting hydraulic cylinders.

8. A harvesting platform as defined by claim 7 wherein the reel is rotatably driven by a hydraulic motor mounted on the first saddle.

9. A harvesting platform as defined by claim 1 wherein the signal generator is a potentiometer.

10. A harvesting platform as defined by claim 9 wherein a sensing arm extends from the potentiometer to the sensing pin.

11. A harvesting platform as defined by claim 10 wherein the slot is formed in a track that is mounted to the first arm.

12. A fore/aft position sensor for a harvesting reel, the harvesting reel being rotatably mounted on saddles, the saddles being mounted to fore/aft extending arms having a longitudinal direction, the fore/aft extending arms being mounted to a frame, the fore/aft position sensor comprising:
    a slot extending longitudinally and in an angle relative to the longitudinal direction of one of the fore/aft extending arms;
    a sensing pin engages the slot for sensing the fore/aft position of the harvesting reel relative to the frame;
    a signal generator is coupled to the sensing pin, as the sensing pin moves longitudinally in the slot the sensing pin also moves relative to the longitudinal direction of the respective fore/aft extending arm resulting in a mechanical sensing signal that is directed to the signal generator for generating a fore/aft position signal.

13. A fore/aft position sensor as defined by claim 12 wherein the slot is angled vertically relative to the longitudinal direction of respective fore/aft extending arm.

14. A fore/aft position sensor as defined by claim 13 wherein the signal generator is a potentiometer.

15. A fore/aft position sensor as defined by claim 14 wherein a sensing arm extends from the potentiometer to the sensing pin.

16. A fore/aft position sensor as defined by claim 15 wherein the slot is formed in a track that is mounted to the respective fore/aft extending arm.

17. A fore/aft position sensor as defined by claim 12 wherein a sensing arm extends from the signal generator to the sensing pin.

* * * * *